United States Patent
Croman et al.

(10) Patent No.: US 7,671,560 B2
(45) Date of Patent: Mar. 2, 2010

(54) METHOD AND APPARATUS FOR HANDLING DEEPLY DISCHARGED BATTERIES IN A MOBILE STATION

(75) Inventors: Russell Croman, Austin, TX (US); G. Diwakar Vishakhadatta, Austin, TX (US); Lionel Cimaz, Pleumeleuc (FR)

(73) Assignee: ST-Ericsson SA, Geneva (CH)

( * ) Notice: Subject to any disclaimer, the term of this patent is extended or adjusted under 35 U.S.C. 154(b) by 628 days.

(21) Appl. No.: 11/525,383

(22) Filed: Sep. 22, 2006

(65) Prior Publication Data

US 2008/0074081 A1 Mar. 27, 2008

(51) Int. Cl.
*H02J 7/00* (2006.01)
*H02J 7/04* (2006.01)
*G01N 27/416* (2006.01)
*H02H 3/24* (2006.01)

(52) U.S. Cl. ............ 320/112; 320/134; 320/135; 320/136; 320/162; 324/426; 361/92

(58) Field of Classification Search ............ 320/112, 320/135, 136, 162; 324/462
See application file for complete search history.

(56) References Cited

U.S. PATENT DOCUMENTS

| | | | | |
|---|---|---|---|---|
| 5,828,202 A | * | 10/1998 | Tamai | 320/141 |
| 6,507,173 B1 | * | 1/2003 | Spiridon et al. | 320/162 |
| 6,614,205 B2 | * | 9/2003 | Nakashimo | 320/134 |

* cited by examiner

*Primary Examiner*—Edward Tso
*Assistant Examiner*—Yalkew Fantu
(74) *Attorney, Agent, or Firm*—Michael C. Martensen; William J. Kubida; Hogan & Hartson LLP (57) ABSTRACT

In one embodiment, the present invention includes a method for performing a test on a rechargeable battery to indirectly determine a state of protection circuitry associated with the battery. The method may discharge the battery by controlling a pull-down current into a system, determine if the battery voltage falls below a first threshold level within a predetermined amount of time, and if so provide a pre-charge current to the battery.

26 Claims, 8 Drawing Sheets

METHOD AND APPARATUS FOR HANDLING DEEPLY DISCHARGED BATTERIES IN A MOBILE STATION

FIELD OF THE INVENTION

Embodiments of the present invention relate to handling rechargeable batteries, and more particularly to handling such batteries that are in a deeply discharged state.

BACKGROUND

Many cellular phones and other compact mobile devices use Lithium-ion (Li-Ion) battery chemistries, as this chemistry has desirable energy density and charge/discharge characteristics. However, this type of battery can suffer from certain disadvantages, including a risk of explosion if overcharged. Other disadvantages may include the possibility of damaging the battery if it is charged too quickly, discharged too quickly, or discharged too thoroughly.

Because of the above factors, one typically finds Li-ion batteries and other rechargeable batteries such as nickel-based batteries not as stand-alone cells, but as battery systems including the actual cell(s), along with additional components and circuits designed to protect the battery and its user. The circuitry can disable a battery if the battery voltage falls below a threshold level, to avoid excessive discharge of the battery.

Furthermore, many devices include control mechanisms to enable charging of the battery pack at various levels, depending on the voltage of the battery pack. While these charging mechanisms are designed to prevent damage to the battery, because of the various protection circuitry that may be present within a battery pack, the voltage obtained from the battery pack may not necessarily be indicative of the actual cell voltage, and thus such charging regimes may not operate as intended.

SUMMARY OF THE INVENTION

In one aspect, the present invention includes a method for performing a test on a rechargeable battery to indirectly determine a state of protection circuitry associated with the battery. The method may include discharging the battery (which may be of a mobile station) by controlling a pull-down current from the battery and into a voltage monitor of the mobile station, determining if the battery voltage falls below a first threshold level within a predetermined amount of time, and if so providing a pre-charge current to the battery, otherwise enabling the mobile station for powering up. In some implementations, the mobile station may be prevented from powering up if the battery voltage drops below the first threshold level within the predetermined amount of time.

Another aspect of the present invention is directed to an apparatus that includes a charging circuit to charge a battery of a cellular telephone. The charging circuit may provide different charging currents to the battery based on its voltage. The apparatus may further include a power sequencer to initiate a pull-down test to draw a pull-down current from the battery. In one implementation, a baseband processor of the cellular telephone may include the charging circuit and the power sequencer, and in some embodiments the power sequencer may be a state machine while the charging circuit may be an asynchronous state machine.

Embodiments of the present invention may be implemented in appropriate hardware, firmware, and software. These embodiments may enable drawing of a pull-down current from a battery into a charger in response to initiation of a state machine powered by the battery. It then may be determined if the battery voltage falls below a threshold level within a predetermined amount of time after initiation of the pull-down current. If so, a pre-charge current may be provided to the battery, otherwise a system may be powered on using the battery.

One embodiment may be implemented in an integrated circuit having both analog and digital circuitry, including charging and monitoring circuitry for a rechargeable battery. Still other embodiments may include a system including such an integrated circuit along with additional components, such as a host processor, memory, input/output devices and the like. In one embodiment, the system may be a wireless device such as a cellular telephone handset, personal digital assistant (PDA) or other mobile device. Such a system may include a transceiver including a charging circuit as described above.

DETAILED DESCRIPTION

In various embodiments, methods and apparatus may be implemented to determine if a battery pack such as may be associated with a mobile station, i.e., cellular phone, personal digital assistant (PDA) or other such system, has become deeply discharged. Based on such a determination, various measures may be taken to protect both the battery cells themselves, the system powered by the battery pack, as well as a user, given the potentially volatile nature of the cell chemistry.

While the scope of the present invention is not limited in this regard, in many implementations a mobile station may be powered by a battery pack that includes a rechargeable battery as well as other circuitry, such as protection circuitry. Typically, the battery pack is coupled to a mobile station via battery terminals, i.e., anode and cathode terminals. Furthermore, some battery packs may include an additional terminal for providing information from a thermistor, i.e., to obtain a reading of battery temperature. Typically, at most only these three terminals may be present to couple a given battery pack to a mobile station, although many battery packs include additional protection circuitry. Specifically, many battery packs may include circuitry to protect against overcharging, excessive discharging and so forth. Because of the limited amount of terminals provided between battery pack and mobile station, however, information that may be available regarding a state of this protection circuitry is generally not available to the mobile station.

Figure 1:
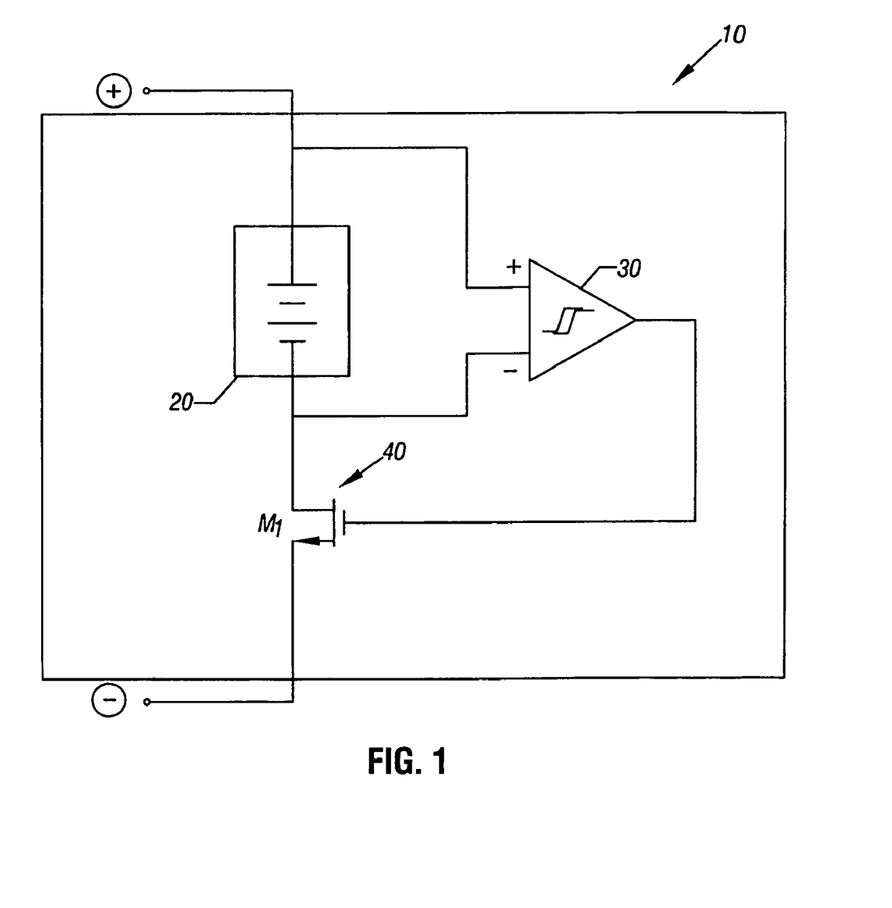
FIG. 1 is a block diagram of a battery pack that includes protection circuitry that may be used with embodiments of the present invention.

Referring now to FIG. 1, shown is a block diagram of a battery pack that includes protection circuitry that may be used with embodiments of the present invention. As shown in FIG. 1, battery pack 10 includes a battery cell 20, which may be a Li-ion cell, in many embodiments. However, in other embodiments another Lithium-based or a nickel-based battery may be present instead. A comparator 30, which may be a hysteretic comparator, is coupled across the battery terminals to sense the actual voltage of cell 20. If this voltage falls below a predetermined threshold, then a switch 40, which may be a n-channel metal oxide semiconductor field effect transistor (MOSFET), is turned off. This denies access to cell 20 from outside battery pack 10, and prevents cell 20 from being discharged further. In this way, battery pack 10 may be protected from under-voltage conditions via this under-voltage lockout mechanism including hysteretic comparator 30 and MOSFET 40. While shown with this simplified circuitry in the embodiment of FIG. 1, it is to be understood that in many implementations additional protection circuitry may be included within a battery pack. Also, multiple cells may be present in various implementations.

To recover battery pack 10 from such a state, which is referred to herein as a deeply discharged or so-called "dead battery" state, the actual cell voltage may be raised above the turn-on threshold of comparator 30 which in turn re-engages switch 40, connecting cell 20 to the pack terminals. Note that the battery state may be referred to as the dead battery state, as when switch 40 is disabled, the terminals of cell 20 are unconnected and no voltage can be provided to the mobile station.

Figure 2:
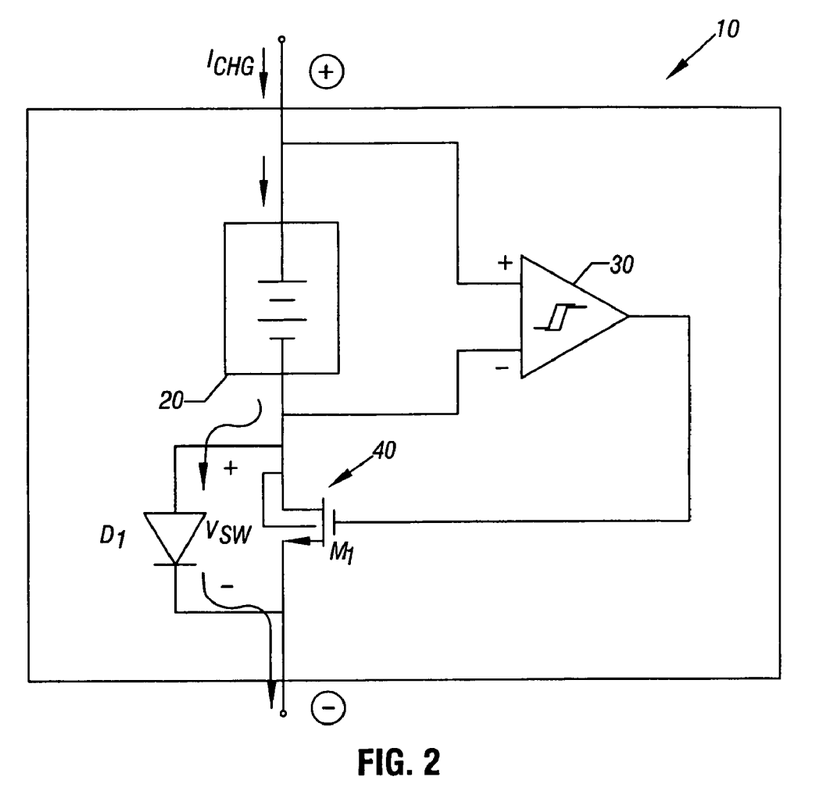
FIG. 2 is another block diagram of the battery pack of FIG. 1.

In different implementations, various manners of providing under-voltage protection may be realized. For example, in the implementation of FIG. 1, switch 40 may be coupled in a drain-bulk connected configuration. In this case, a source-to-bulk diode (D1), as shown in FIG. 2, provides a path by which cell 20 can be charged via a charging current, $I_{CHG}$, when switch 40 is in the off state, as shown in FIG. 2.

While this method may prevent over-discharge of cell 20, a circuit responsible for charging battery pack 10 may not have correct information on which to base a charging decision. That is, such charging circuits typically rely solely on the voltage presented by the battery pack across its external terminals to determine the state of the pack. The implicit assumption is that this voltage uniquely determines the state. With protection circuitry such as that shown in FIGS. 1 and 2, however, this assumption is no longer correct.

For a bare Li-ion cell, Table 1 below, shows how charging of the cell may be handled by a charging circuit based on cell voltage.

TABLE 1

| Measured Voltage | State | Handling |
|---|---|---|
| Vcell < 3.2 V | Deeply discharged | Charge at ≦50 mA |
| 3.2 V ≦ Vcell < 4.2 V | Discharged | Fast charge at ≦1 A (e.g., constant current) |
| Vcell = 4.2 v | ~70% Charged | Hold Vcell at 4.2 V (e.g., constant voltage) (current tapers off) |
| Vcell = 4.2 V, if Ichg ~0.05 a | Fully charged | Stop charging |

As shown in Table 1, in the deeply discharged state, the charging current may be kept at a relatively low level to avoid damage to the cell. Thus when a deeply discharged state is detected, charging may be performed with a relatively low charging current to protect the cell. When the cell reaches a higher voltage indicative of a discharged (but not deeply discharged) state, charging may be performed more rapidly, using a greater charge level, e.g., via a fast charging current which may be at between approximately 500 milliamperes (mA) and 1 A. After this point, the cell may be more fully charged, such that a charging algorithm may move from a constant current regime in which charge is rapidly injected into the battery cell to a constant voltage regime, where the charging current falls off, possibly at an exponential rate. When a relatively low current level, e.g., 0.05 amps is reached, charging may be terminated.

Note that such a charging algorithm may be implemented via a charger of the mobile station. In many implementations, charging circuitry may be present in a baseband processor of the mobile station. In one embodiment, this baseband processor may be a single-chip integrated circuit (IC) that further includes RF circuitry, however the scope of the present invention is not so limited. In many implementations, a separate applications processor (e.g., a central processing unit (CPU)) of the mobile station may also monitor the charging. However, this applications processor may not be functioning, particularly at lower voltages. That is, the charging circuitry may be active when a line current is available, as when the mobile station is plugged into an AC adapter for charging. However, at the lower voltage levels of the battery pack, the applications processor may not be operating. Accordingly, charging control may be primarily implemented via the charging circuitry, which may be implemented in the baseband processor.

Because the protection circuitry within a battery pack may or may not be on, and because its state is not directly observable from outside the battery pack, using the battery pack's voltage to determine the state of the cell may be incorrect, and could cause the charging circuitry to damage the cell. To understand this, consider the case in which the battery pack has been discharged below the cut-off threshold of comparator 30 in FIG. 2. This threshold or reference voltage may be determined by a reference circuit in the battery pack (not shown in FIG. 2), and may have a value of 2.5 V, in one embodiment. Thus if cell 20 is discharged below 2.5 V, comparator 30 will turn off protection switch 40.

Now consider charging this "dead" pack. At first, the apparent voltage of the pack is essentially zero, since the cell has been disconnected by the protection circuitry. If the battery pack is in a cellular phone that is then plugged into a line current to enable charging, a charger that operates in accordance with the handling shown in Table 1 may thus attempt to force a small pre-charge current into the cell, typically on the order of 50 mA.

With reference back to FIG. 2, because cell 20 is internally disconnected, the pack's terminal voltage will quickly rise in response to the pre-charge current. When the pack's terminal voltage is sufficiently high, the source-to-bulk diode D1 will forward bias, and the pre-charge current will indeed flow through cell 20. The problem lies in the apparent battery voltage in this situation. If diode D1 is a typical PN silicon junction diode, it will have a forward bias voltage of roughly 0.7 V. If the actual cell voltage is 2.5 V, then the total voltage at the terminals of pack 10 is the sum of the cell and the diode voltages: 2.5 V+0.7 V=3.2 V. A charger that operates in accordance with Table 1 may in response to measuring a 3.2 V level across the pack transition into a fast-charge mode in which a large amount of current is forced into the pack. Since the cell is actually still deeply discharged (e.g., 2.5 V in this example), such operation may be inappropriate and the cell could be damaged, compromising the performance of the cell and perhaps even the safety of the user.

A mobile device may further include battery voltage sensing circuitry that prevents the system from starting if the voltage is too low. In a cell phone, for example, the system may be prevented from fully powering on if the battery voltage is below a threshold voltage, e.g., 3.5 V. The same circuitry may also be used to begin a system shutdown sequence. That is, if the system is fully powered on and the battery voltage should fall below a predetermined threshold, a shutdown sequence is started while there is still sufficient battery capacity to complete it. This allows time for such things as alerting the phone's base station that the phone is going off line, closing any open file system items in the phone, and in general performing shutdown tasks that may be done to gracefully power down the system.

Again, a situation exists in which the apparent battery voltage is being used as the sole indication of the state of the battery cell. In the case of a "dead" battery pack that is being pre-charged by the charging circuit, an error can be made that may cause the system to endure a repetitive sequence of attempts to power on, followed by abrupt and un-graceful shutdown events.

As described above with reference to FIG. 1, the battery protection circuitry included in battery pack 10 disconnects cell 20 from the pack's terminals when the cell voltage falls below a certain voltage, e.g., approximately 2.5 V. Comparator 30 may re-engage cell 20 once it is charged back up to a sufficiently high voltage. To ensure consistent operation, comparator 30 may have a relatively large amount of hysteresis, e.g., on the order of 0.5 V. Thus cell 20 may be re-charged to approximately 3.0 V before it is re-engaged by the protection circuitry. Thus, in this "dead" or protected state, the voltage across the terminals of battery pack 20 may reach approximately 3.7 V before cell 20 is re-engaged, due to the sum of the cell voltage (~3.0 V) and the drop across the source-to-bulk diode (D1) of switch 40 (FIG. 2).

In this scenario (e.g., pre-charging a "dead" pack) the apparent battery voltage may rise high enough to cause the phone system to attempt to fully power on (e.g., at a pack voltage of approximately 3.5 V). However, this operation typically draws much more than the pre-charge current of approximately 50 mA from the battery. Thus, this power-on attempt may cause the battery pack's voltage to collapse very rapidly. An under-voltage lockout threshold of the phone system will be reached, and the phone system may abruptly power down. Following this, the battery pack's voltage may again climb due to the pre-charge current, causing the system to once again attempt a power-up, followed again by a subsequent under-voltage event. Thus it can be seen that a number of such cycles may occur in rapid succession. Such behavior may corrupt the phone's flash file system and/or cause other undesirable effects.

In various embodiments, the state of internal protection circuitry provided in a battery pack may be indirectly determined, even though no direct communication of the state or other information associated with the protection circuitry may be provided from the battery pack. As described above, battery packs typically include only limited terminals, namely positive and negative battery terminals, along with possibly a thermistor value. Thus, protection circuitry and a state thereof (such as enabled or disabled), does not have any direct means to communicate this information from the battery pack to a mobile station. In various embodiments, it may be determined whether an internal protection switch or other under-voltage protection mechanism has been activated (e.g., switch disabled) despite such direct communication abilities, so that the protection state of a battery pack may be obtained using only the terminals already on the pack (and thus may be legacy compatible). That is, while information regarding the state of a protection switch may be directly observed, e.g., by providing a voltage indicative of the switch's gate terminal, there is not an available terminal in many battery packs for such information. Accordingly, embodiments may indirectly determine the protection state of a battery pack using only the terminals already on the pack.

Figure 3:
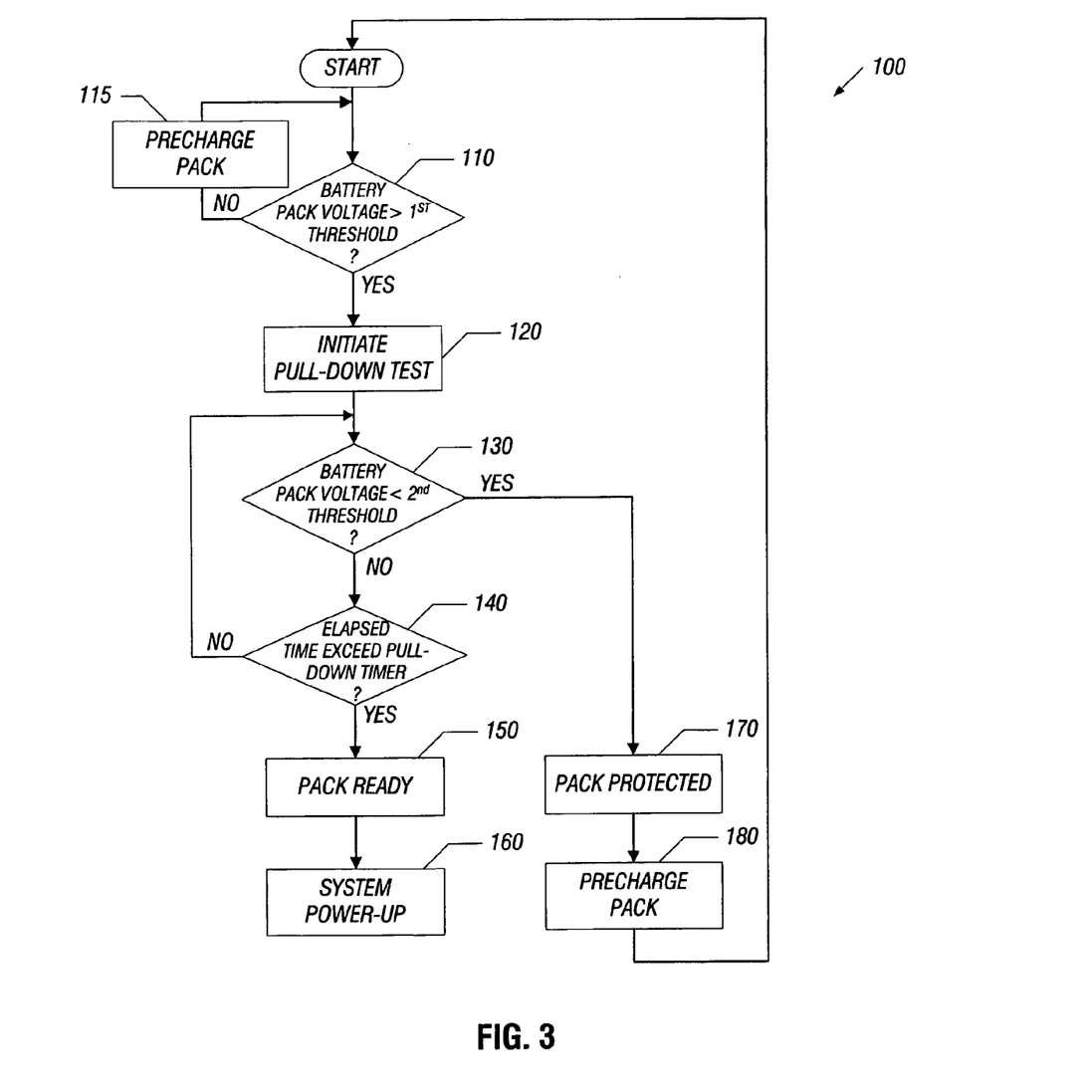
FIG. 3 is a flow diagram of a method in accordance with one embodiment of the present invention.

As described above with regard to FIG. 2, in the protected state switch 40 is open. Thus if an attempt is made to draw current from battery pack 10, the voltage will quickly collapse. Embodiments may leverage this fact to determine the protection status of a battery pack with which a mobile station is associated. Referring now to FIG. 3, shown is a method of handling a battery pack in accordance with one embodiment of the present invention. In some embodiments, method 100 may be performed when a cellular phone including a battery pack is plugged into, e.g., an outlet for charging and/or operation. As shown in FIG. 3, method 100 may begin by determining whether a battery pack voltage is greater than a first threshold level (block 110). In various embodiments, this first threshold level may correspond to a voltage level that is indicative of a deeply discharged state. For example, this threshold level may be set at approximately 2.9 V, in some embodiments. Note that with the voltage drop of a protection circuit of a battery pack, this voltage level may correspond to a deeply discharged battery. If the measured battery pack voltage is not greater than the first threshold, control may pass from diamond 110 to block 115 to initiate a precharge of the battery pack, before looping back to again test for the desired threshold voltage level. Depending on how low the battery pack voltage is, this precharge current may be at multiple levels.

If at diamond 110 it is determined that the battery pack voltage is greater than the first threshold level, control passes to block 120. At block 120, a pull-down test may be initiated. More specifically, a baseband processor of a cell phone may initiate the pull-down test. Such a pull-down test may cause a small amount of charge to be drawn from the battery pack. While the scope of the present invention is not limited in this regard, in one embodiment this pull-down current may be approximately 10 mA, substantially lower than even pre-charge current (e.g., as in Table 1). As shown in FIG. 3, this pull-down test may be initiated at a time T=0.

Control then passes from block 120 to diamond 130, where it may be determined whether the battery pack voltage has fallen below a second threshold level. The determination at diamond 130 may determine whether the pull-down current drawn from the battery causes the battery pack voltage to fall below this threshold level. While the scope of the present invention is not limited in this regard, in some implementations this threshold level may be approximately 2.7 V. If a protection circuit of the battery is enabled because the battery pack is at a low voltage level, the battery pack voltage will quickly fall below this threshold level.

Referring still to FIG. 3, if it is determined at diamond 130 that the battery pack voltage has not fallen below this second threshold level, control passes to diamond 140. At diamond 140, it may be determined whether the time elapsed since initiation of the pull-down test has exceeded a length of a pull-down timer (i.e., $T=T_{PD}$). Such a timer may be set at a predetermined level that is indicative of a time period after which it is reasonably certain that sufficient charge exists in the battery pack to handle normal powering. While the scope of the present invention is not limited in this regard, in one embodiment the timer may be set at approximately 120 milliseconds (ms). If at diamond 140 the elapsed time has not exceeded the length of the pull-down timer, control passes back to diamond 130 for further determination of the battery pack voltage.

If instead at diamond 140 it is determined that the pull-down test has been performed for more than the threshold time, control passes to block 150. That is, because the battery pack voltage has not fallen below the threshold level, even after the pull-down current has been drawn from the battery for at least the threshold time period, the battery pack is sufficiently alive and ready to be charged (as represented by block 150). Accordingly, a normal system power up may then occur (block 160).

Referring still to FIG. 3, if instead at diamond 130 it is determined that the battery pack voltage is less than the second threshold level, control passes to block 170, which indicates that the battery pack state is in a protected state, i.e., a protection circuit of the battery pack is enabled (e.g., a switch is disabled) because of a low voltage level of the battery pack. Accordingly, method 100 may proceed to block 180, where the battery pack may be pre-charged with a pre-charge current so as to not negatively impact the battery. After pre-charging the battery pack, control may pass back for further execution of method 100 to determine whether the pack remains in a protected state. While shown with this particular implementation in the embodiment of FIG. 3, it is to be understood the scope of the present invention is not limited in this regard.

Various manners of implementing a pull-down test such as that set forth in FIG. 3 may be realized. In different implementations, hardware, software, firmware or combinations thereof may be used to implement a pull-down test to indirectly determine a state of protection circuitry within a battery pack. In many embodiments, an article in the form of a machine-readable storage medium may be present onto which there are stored instructions and data that form a software program to perform a pull-down test in accordance with an embodiment of the present invention.

Figure 4:
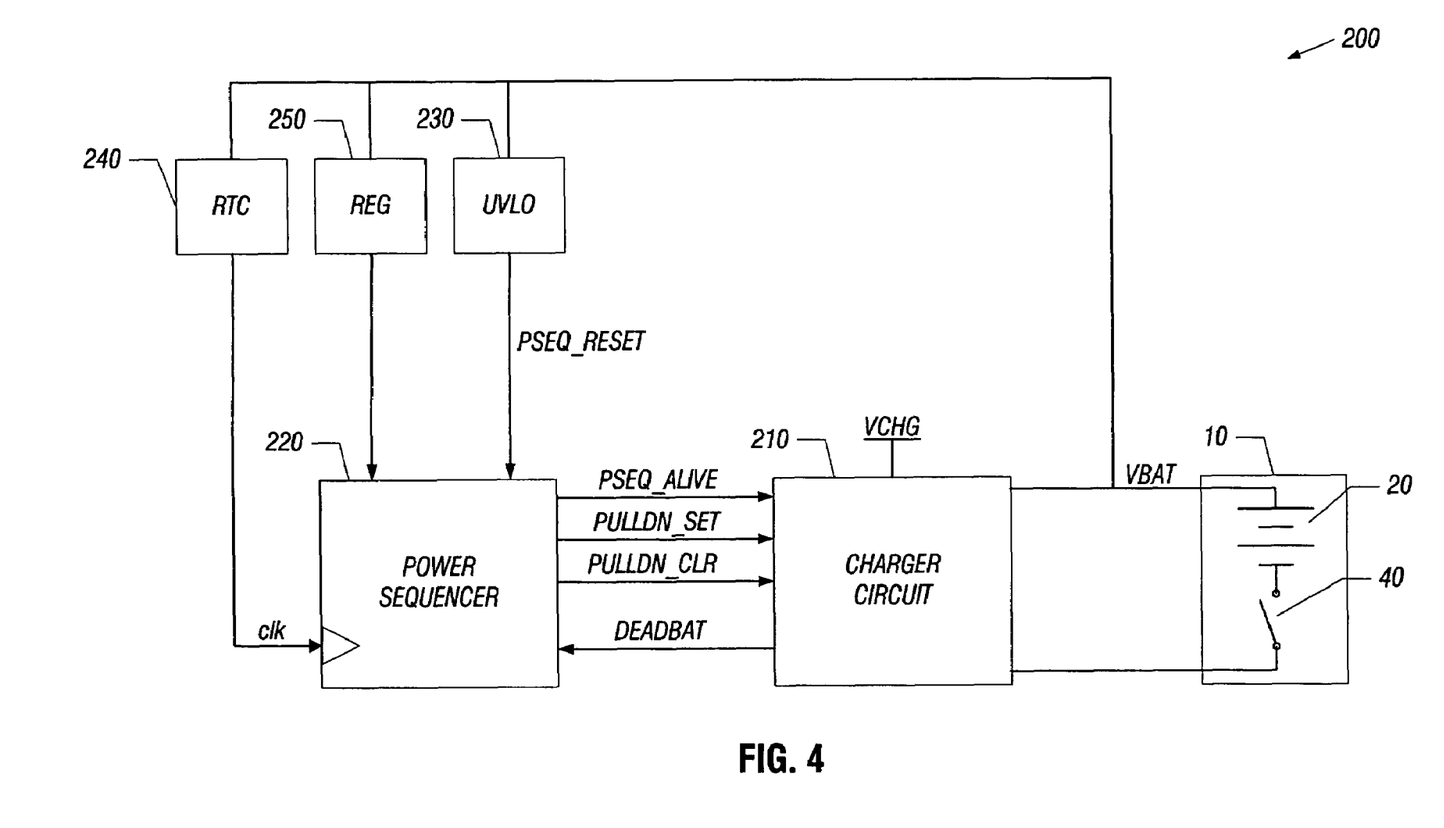
FIG. 4 is a block diagram of a portion of a system in accordance with one embodiment of the present invention.

Furthermore, in different implementations, hardware and software may be located in various portions of a system such as a cellular telephone. As one example, a cellular phone may include various components, including an applications processor, a baseband processor, RF circuitry and so forth. In different implementations different parts of these circuits (with the exception of the RF circuitry) may be used in handling a battery pack. Referring now to FIG. 4, shown is a block diagram of a portion of a system in accordance with one embodiment of the present invention. As shown in FIG. 4, system 200 may include a baseband processor having various components. The baseband processor is coupled to a battery pack 10, which includes a cell 20 and a protection switch 40. While shown with these limited components for ease of illustration in FIG. 4, it is to be understood that a system such as a cellular telephone or other mobile station may include many more components.

In the embodiment of FIG. 4, the baseband processor includes a charger circuit 210 that is coupled to receive an independent charging voltage $V_{CHG}$, which may be a charging voltage obtained from a line current when system 200 is plugged into a wall outlet or other source of AC power. Charger circuit 210 is coupled to provide a charging current to battery pack 10. Charger circuit 210 is further coupled to a power sequencer 220 which may be, in one embodiment, a finite state machine that is clocked by a real time clock (RTC) 240 which may provide a clock signal (CLK), which in one embodiment may be a 32 KHz clock signal, to power sequencer 220. Power sequencer 220 may be powered by a voltage from a regulator 250 that receives its operating voltage from the battery voltage, $V_{BAT}$. Furthermore, an under-voltage lockout (UVLO) circuit 230 is also powered by the battery voltage. In various embodiments, UVLO circuit 230 may include circuitry, logic, or combinations thereof to measure a voltage level of the battery and, if the voltage level falls below a threshold level, i.e., an under-voltage threshold, UVLO circuit 230 generates a signal to indicate the under-voltage so that system 200 may take measures to properly shut down to avoid loss of data or damage to voltage components. Accordingly, when an under-voltage condition is determined in UVLO circuit 230, a reset signal, PSEQ_RESET, may be generated and provided to power sequencer 220.

In one embodiment, method 100 (of FIG. 3) may be accomplished by the combined action of power sequencer 220 and charger circuit 210. Such separation may be implemented as charger circuit 210 can operate autonomously in certain situations, such as when the battery voltage is very low—too low to support operation of power sequencer 220. In one embodiment, power sequencer 220 may be a finite state machine that handles power and mode control for the entire system. Power sequencer 220 may be of a synchronous design, being clocked by the 32 KHz real-time clock, which may be always present. Because clocks can negatively impact circuitry in an RF environment, charger circuit 210 may be an asynchronous state machine to avoid needing the RTC signal. Thus in various embodiments, the pull-down test operation may be separated between charger circuit 210 and power sequencer 220.

Figure 5:
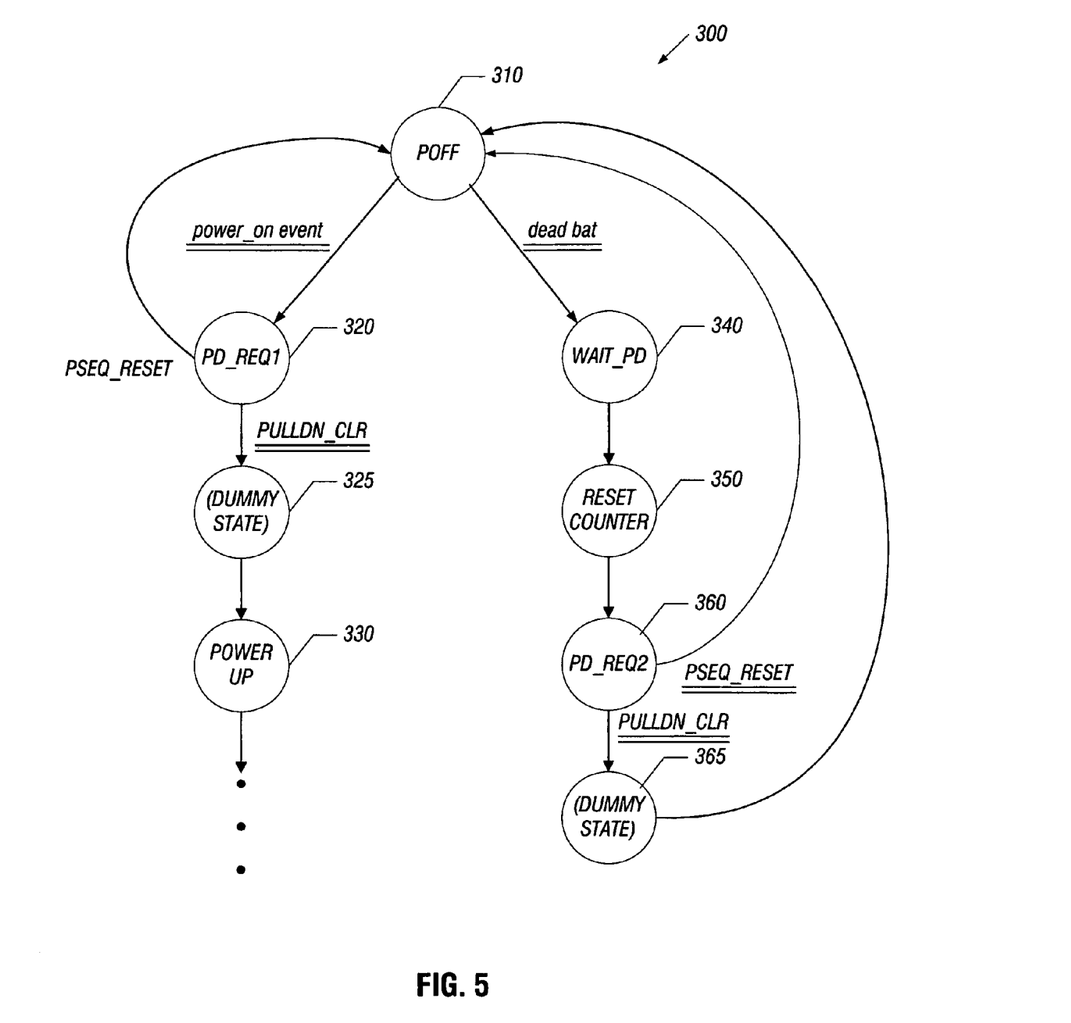
FIG. 5 is a partial state diagram of a power sequencer in accordance with one embodiment of the present invention.

In various implementations, power sequencer 220 may enter a power off (POFF) state whenever PSEQ_RESET is asserted. Note that the various additional signals shown in FIG. 4 will be discussed further below. Referring now to FIG. 5, shown is a partial state diagram of a power sequencer in accordance with one embodiment of the present invention. Consider a situation where a phone is off, but the system attempts to power up when the phone is connected to its charger. As shown in FIG. 5, state diagram 300 may begin when power sequencer 220 enters a power off (POFF) state 310. From the power off state 310, when the phone is powered on by the provision of a charging supply, control passes to a state 320 in which a first pull-down request (PD_REQ1) is initiated. State 320 may initiate a battery pack pull-down test, as described above with regard to FIG. 3. As will be discussed below, another state machine, e.g., of power sequencer 220, may control the pull-down test. If during the pull-down test, the power sequencer reset signal is activated (i.e., UVLO circuit 230 asserts the PSEQ_RESET signal), the system assumes that it is dealing with a protected battery pack that is deeply discharged. A dead battery signal (DEADBAT) is asserted to provide such an indication to the system and control passes back to state 310, i.e., the power off state. If instead, the pull-down test passes, a pull down clear signal, PULLDN_CLR, is generated and provided to charger circuit 210. Power sequencer 220 then enters a so-called dummy state 325 in which power sequencer 220 waits to initiate a normal power up of the cell phone, as represented by state 330.

Referring still to FIG. 5, if upon exiting power off state 310, the dead battery signal (DEADBAT) is asserted (from charger circuit 210) indicating a deeply discharged battery exists, power sequencer 220 traverses the right hand side of FIG. 5 to enter into a wait (WAIT_PD) state 340 in which the battery pack is allowed to pre-charge for, e.g., 4 second intervals in one embodiment. Then a reset state 350 may be entered in which a timeout counter may be reset. Accordingly, control passes to a state 360 in which a request for a pull-down test occurs (PD_REQ2). If UVLO circuit 230 should determine a low battery condition occurs during the pull-down test, it will issue a reset signal (PSEQ_RESET), and control will pass back to power off state 310.

When the battery voltage rises high enough, UVLO circuit 230 will de-assert the PSEQ_RESET signal. Power sequencer 220 will again enter the POFF 310 state in FIG. 5. Again, it will follow the right-hand branch in FIG. 5 due to DEADBAT being asserted. The battery pack is allowed to pre-charge for, e.g., four-second intervals, and may be periodically re-tested to determine if the protection circuit has been engaged. Once it has, the normal (left-hand) state path is followed. For a discharged pack, this may include powering up the microprocessor, which would then command the charger into a fast-charge mode (not shown) to fully charge the battery.

If instead at state 360 the pull-down test is successful, a pull-down clear signal is generated to conclude the pull-down test, and a dummy state 365 is entered until control returns to the power off state 310. Control will then pass down the left side of FIG. 5, as the DEADBAT signal will be deasserted. While shown with this particular implementation in the embodiment of FIG. 5, it is to be understood that operation of a power sequencer in accordance with an embodiment of the present invention may take other forms and other embodiments.

Figure 6:
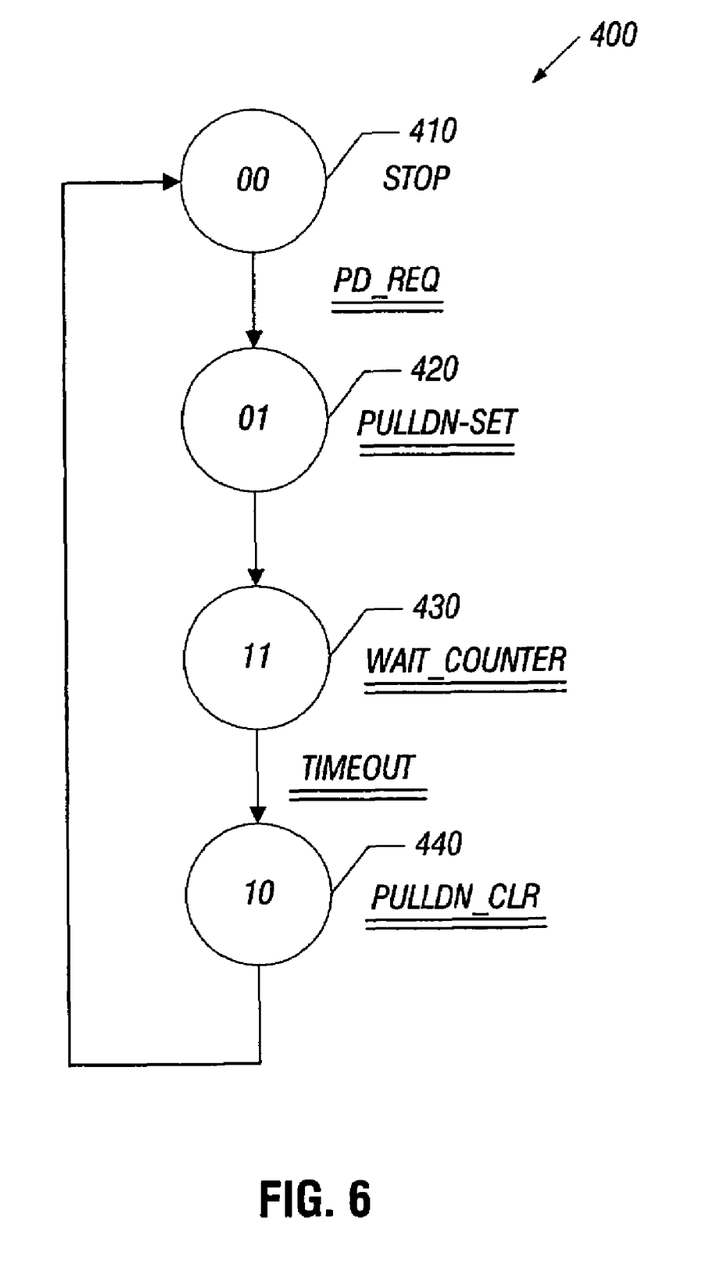
FIG. 6 is a state diagram for a pull-down test state machine in accordance with an embodiment of the present invention.

Referring now to FIG. 6, shown is a state diagram for a pull-down test state machine in accordance with an embodiment of the present invention. As shown in FIG. 6, state diagram 400, which may be performed in the power sequencer, may begin at a stop state 410. Control passes from state 410 to a pull-down initiation state 420 upon receipt of a pull-down request (i.e., PD_REQ), in which a signal (PULLDN_SET) may be sent to charger circuit 210 to initiate the pull-down test. From state 420, control passes to a wait state 430. This wait state may correspond to a length of the pull-down test. At the conclusion of the wait state 430, e.g., on time out of a timer (which may be set, for example, for a time of approximately 127 milliseconds) the test may be determined to be successful if the counter times out prior to a reset signal from UVLO circuit 230. Accordingly, a clear state 440 is reached in which a control signal (PULLDN_CLR) is sent to charger circuit 210 end the pull-down test.

Figure 7:
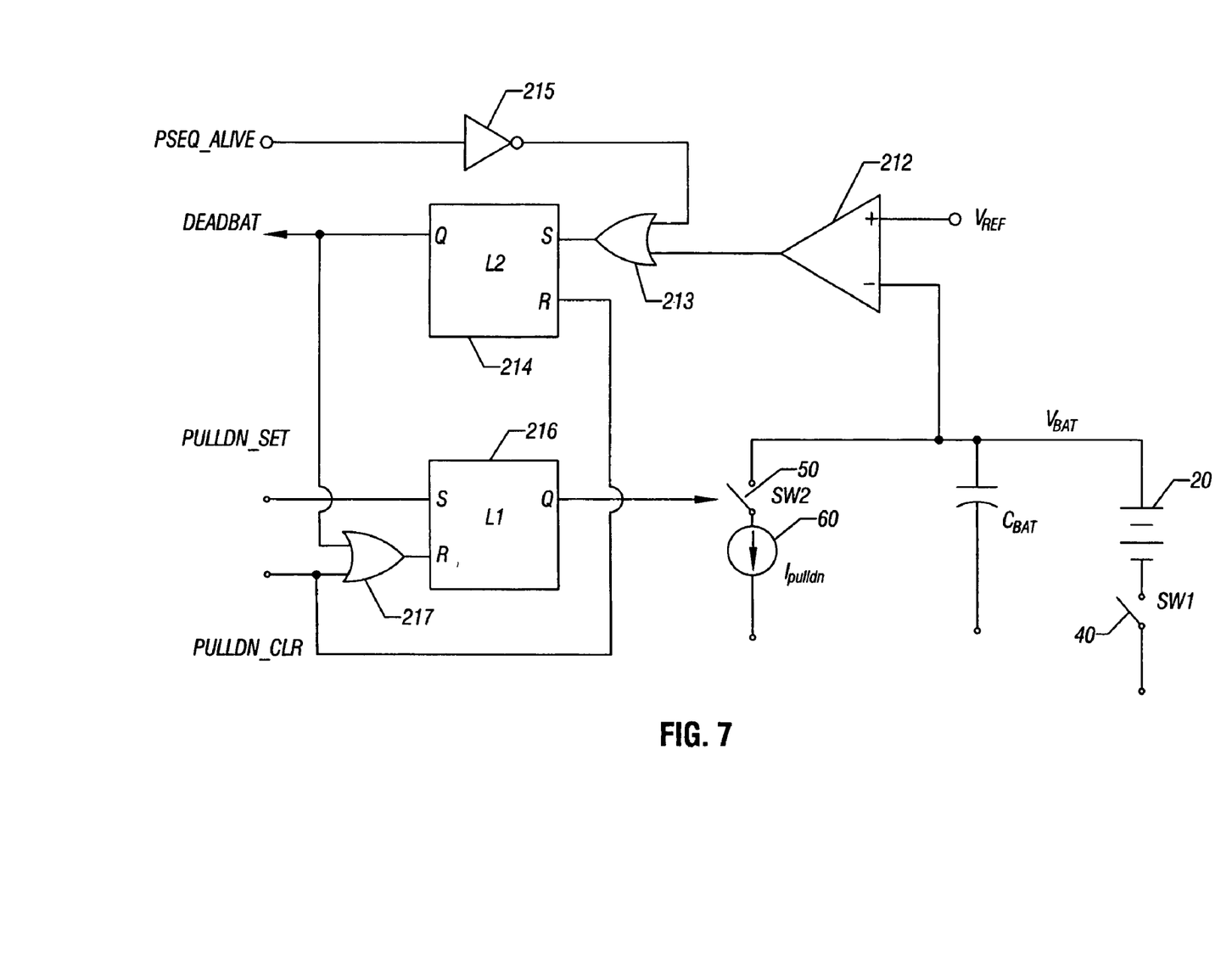
FIG. 7 is a schematic diagram of pull-down circuitry in accordance with an embodiment of the present invention.

In various embodiments, charger circuit 210 may include various circuitry, logic or other mechanisms to handle a pull-down test in accordance with an embodiment of the present invention. Referring now to FIG. 7, shown is a schematic diagram of pull-down circuitry that may be present in a charger in accordance with an embodiment of the present invention. As shown in FIG. 7, various circuitry may be coupled to a battery cell 20 that includes a protection circuit (e.g., a switch 40, also denoted as SW1) in accordance with an embodiment of the present invention. If a voltage of cell 20 should fall below a threshold level, switch 40 is opened. Note that cell 20 provides a battery voltage, $V_{BAT}$. Also present is a capacitance, $C_{BAT}$, which represents intentional and parasitic capacitances of the battery pack. The battery voltage from cell 20 is provided to a comparator 212 that further receives a reference voltage, $V_{REF}$. So long as the battery voltage is greater than the reference voltage, the output of comparator 212 will be low. In turn, an output of a logic gate 213, which may be an OR gate, may also be low. Accordingly, an output of a latch (L2) 214 coupled to an output of OR gate 213 may be deasserted, so long as sufficient battery voltage is present. Accordingly, a dead battery signal (DEADBAT) from the charger remains deasserted.

If this signal should become asserted (or if an under-voltage is detected) it may be provided to a power sequencer. By maintaining an asserted dead battery signal, when a power sequencer exits a power off state, the right hand side of the state diagram of FIG. 5 will be traversed by the state machine of the power sequencer, such that this signal represents a nonvolatile indicator to the state machine of the power sequencer regarding the current battery status.

Referring still to FIG. 7, to initiate a pull-down test an incoming signal, e.g., from a power sequencer, namely a pull-down set (PULLDN_SET) may be received and provided to a latch (L1) 216. The setting of latch 216 may enable a second switch (SW2) 50 within the charger circuit. By closing switch 50, a pull-down current source ($I_{PULLDN}$) 60 may be switched in, causing a pull-down current to be pulled from cell 20. In some embodiments, current source 60 may be at a level of approximately 10 mA, although the scope of the present invention is not so limited.

If the battery pack is not in a protected state, then $V_{BAT}$ will decrease only slightly when the pull-down current is engaged. The power sequencer will remain alive for the duration of the pull-down test and will assert the PULLDN_CLR signal, resetting latch 216 via OR gate 217, ending the test and disengaging the pull-down current by disabling switch 50. Thus the pack has been tested and found to be active (i.e., not protected).

If the battery pack is instead in its protected state when the pull-down test is begun, $V_{BAT}$ will begin to discharge at a constant rate, given by $$\frac{\Delta V_{BAT}}{\Delta t} \equiv \frac{I_{pulldn}}{C_{BAT}},$$

where $C_{BAT}$ is the total intentional and parasitic capacitance on the $V_{BAT}$ node, which may be as high as 500 μF, in one embodiment. With a pull-down current of 10 mA, the voltage may rapidly fall as follows:

$$\frac{\Delta V_{BAT}}{\Delta t} \equiv \frac{10 \text{ mA}}{500 \text{ μF}} \equiv 20 \text{ } \frac{\text{mV}}{\text{mS}}.$$

When $V_{BAT}$ is discharged to approximately 2.5 V, UVLO circuit 230 will assert the PSEQ_RESET signal, causing PSEQ_ALIVE to go low. This causes the "set" input of latch 214 to be asserted (via inverter 215 and OR gate 213), setting the DEADBAT signal. Thus the pack has been discovered to be in its protected state. Following this, the pull-down operation is automatically halted, since the assertion of DEADBAT (through OR gate 217) will cause latch 216 to be cleared, disabling switch 50. The charger circuit may then autonomously pre-charge the battery pack at a nominal current of 50 mA (not shown), causing $V_{BAT}$ to rise. Note that while FIG. 7 details circuitry that may be present in one embodiment, in other implementations pull-down functionality of a charger may be implemented in an asynchronous state machine which replicates the functionality described above.

Figure 8:
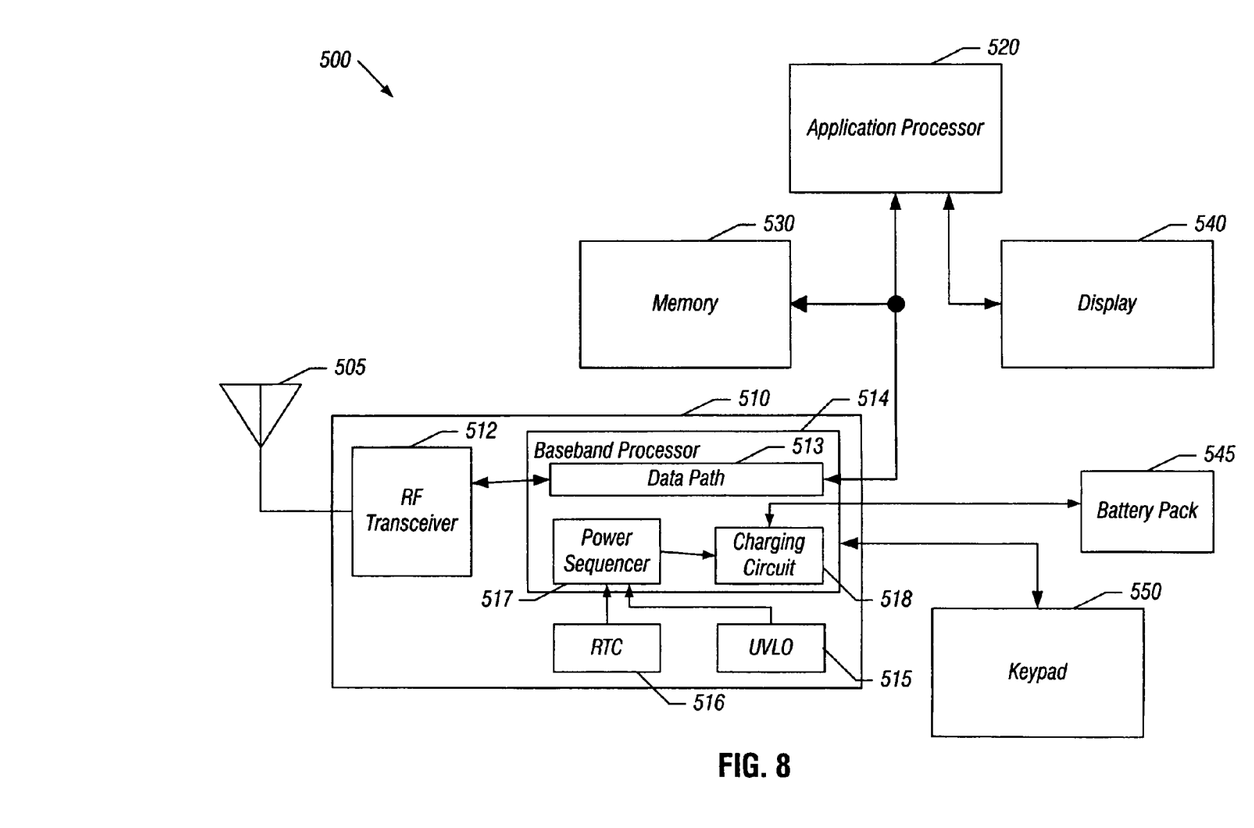
FIG. 8 is a block diagram of a system in accordance with an embodiment of the present invention.

Referring now to FIG. 8, shown is a block diagram of a system in accordance with one embodiment of the present invention. As shown in FIG. 8, system 500 may be a wireless device, such as a cellular telephone, PDA, portable computer or the like. An antenna 505 is present to receive and transmit radio frequency (RF) signals. Antenna 505 may receive different bands of incoming RF signals using an antenna switch. For example, a quad-band receiver may be adapted to receive global system for mobile (GSM) communications, enhanced GSM (EGSM), digital cellular system (DCS) and personal communication system (PCS) signals, although the scope of the present invention is not so limited. In other embodiments, antenna 505 may be adapted for use in a general packet radio service (GPRS) device, a satellite tuner, or a wireless local area network (WLAN) device, for example.

Incoming RF signals are provided to a transceiver 510 which may be a single-chip transceiver including both RF components and baseband components. Transceiver 510 may be formed using a complementary metal-oxide-semiconductor (CMOS) process, in some embodiments. Thus as shown in FIG. 8, transceiver 510 includes an RF transceiver portion 512 and a baseband processor 514. RF transceiver portion 512 may include receive and transmit portions and may be adapted to provide frequency conversion between the RF spectrum and a baseband. Baseband signals are then provided to a baseband processor 514 for further processing. As shown in FIG. 8, baseband processor 514 includes a datapath 513 that can be used to process received baseband signals from RF transceiver 512 and provide them to other portions of system 500. Furthermore, baseband processor 514 may further include a power sequencer 517 and a charging circuit 518, such as described above. Using these components, baseband processor 514 may perform a pull-down test to determine indirectly a state of protection circuitry within a battery pack 545, which provides battery power to system 500. As further shown in FIG. 8, baseband processor 510 may include additional circuitry, such as a real time clock 516 that is used to provide a reference clock signal to baseband processor 514. Additionally, an under-voltage lockout circuit 515 may be present that can generate a signal to control powering down of system 500 should an under-voltage condition be detected from battery pack 545. While shown with this particular circuitry in the embodiment of FIG. 8, it is to be understood that pull-down test and circuitry to control the same may be present in other locations, in different embodiments.

After processing signals received from RF transceiver 512 through datapath 513, baseband processor 514 may provide such signals to various locations within system 500 including, for example, an application processor 520 and a memory 530. Application processor 520 may be a microprocessor, such as a central processing unit (CPU) to control operation of system 500 and further handle processing of application programs, such as personal information management (PIM) programs, email programs, downloaded games, and the like. Memory 530 may include different memory components, such as a flash memory and a read only memory (ROM), although the scope of the present invention is not so limited. Additionally, a display 540 is shown coupled to application processor 520 to provide display of information associated with telephone calls and application programs, for example. Furthermore, a keypad 550 may be present in system 500 to receive user input.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: discharging a rechargeable battery of a system via controlling a pull-down current from the rechargeable battery into the system; to determine whether a voltage of the rechargeable battery falls below a first threshold level within a predetermined amount of time and wherein the voltage of the rechargeable battery falls below the first threshold within the predetermined amount of time, the charging circuit provides a pre-charge current to the rechargeable battery; and if so, providing a pre-charge current to the rechargeable battery, otherwise powering up the system using the rechargeable battery.

2. The method of claim 1, further comprising providing the pre-charge current to the rechargeable battery if a protection circuit of a battery pack including the rechargeable battery is enabled, wherein the battery pack is coupled to the system only via a cathode terminal, an anode terminal, and a thermistor terminal.

3. The method of claim 1, further comprising preventing powering up of the system if the voltage of the rechargeable battery drops below the first threshold level within the predetermined amount of time.

4. The method of claim 2, further comprising preventing a power sequencer of the system from controlling the pull-down current from the rechargeable battery for at least a threshold time period if the protection circuit is enabled.

5. The method of claim 4, further comprising disabling the power sequencer if the voltage of the rechargeable battery is less than the first threshold level.

6. The method of claim 1, further comprising indirectly determining a protection state of a protection circuit associated with the rechargeable battery based on the determining.

7. The method of claim 1, further comprising providing a first signal from a state machine to a pull-down circuit of the system to initiate delivery of the pull-down current to the pull-down circuit.

8. The method of claim 7, further comprising generating a second signal in the pull-down circuit if the voltage of the rechargeable battery falls below the first threshold level, wherein the second signal is to terminate the pull-down test.

9. An apparatus comprising:
a charging circuit to charge a rechargeable battery, the charging circuit to provide different charging currents to the rechargeable battery based on a voltage of a battery pack including the rechargeable battery; and
a power sequencer to initiate a pull-down test to draw a pull-down current from the rechargeable battery to determine whether a voltage of the rechargeable battery falls below a first threshold level within a predetermined amount of time and wherein responsive to the voltage of the rechargeable battery falls below the first threshold within the predetermined amount of time, the charging circuit provides a pre-charge current to the rechargeable battery.

10. The apparatus of claim 9, wherein the apparatus comprises a baseband processor of a cellular telephone.

11. The apparatus of claim 9, wherein the power sequencer comprises a state machine coupled to receive a real time clock.

12. The apparatus of claim 11, wherein the charging circuit comprises an asynchronous state machine.

13. The apparatus of claim 10, wherein the charging circuit is powered by a charging voltage obtained from a line current, the charging circuit to be active when the cellular telephone is coupled to the line current and the rechargeable battery is in a protected state, and the power sequencer is inactive.

14. The apparatus of claim 13, wherein the charging circuit is to signal the power sequencer that the rechargeable battery is in the protected state after the power sequencer exits the inactive state.

15. The apparatus of claim 9, wherein the charging circuit comprises a comparator to compare the voltage of the battery pack to a reference voltage; and
a circuit to generate a battery status signal indicative of a status of a protection circuit of the battery pack if the voltage of the battery pack is below the reference voltage.

16. The apparatus of claim 15, wherein the battery status signal is coupled to the power sequencer to inform the power sequencer of the status of the protection circuit upon wakeup of the power sequencer, and wherein the battery status signal is to terminate the pull-down test, when asserted.

17. The apparatus of claim 16, wherein the pull-down current is less than a pre-charge current to be provided from the charging circuit to the rechargeable battery to pre-charge the rechargeable battery.

18. A system comprising:
a battery pack including at least one cell and a protection circuit;
a first processor to perform operations on data, the first processor to be powered by the battery pack; and
a charger coupled to the first processor and the battery pack, the charger to indirectly determine a state of the protection circuit based on a result of a pull-down test performed on the battery pack and wherein responsive to the pull-down test indicating that the battery pack is deeply discharged, providing a pre-charge current to the battery pack.

19. The system of claim 18, wherein the charger is to initiate the pull-down test upon receipt of a first control signal from a power sequencer coupled to the charger, and wherein the pull-down test is to test for a deeply discharged state of the battery pack.

20. The system of claim 19, further comprising a baseband processor coupled to the first processor, wherein the baseband processor includes the charger and the power sequencer.

21. The system of claim 20, wherein the charger comprises an asynchronous state machine and the power sequencer comprises a finite state machine.

22. The system of claim 21, wherein the power sequencer is to signal the charger to initiate the pull-down test, and wherein the charger is to signal the power sequencer regarding a low battery condition after the power sequencer is reinitiated after a power down state.

23. The system of claim 19, wherein the charger further comprises:
a current source to be coupled to the battery pack in response to the first control signal; and
a logic circuit to decouple the current source from the battery pack if a voltage of the battery pack falls below a threshold value before completion of the pull-down test.

24. An article comprising a machine-readable storage medium including instructions that enable a system to:
draw a pull-down current from a rechargeable battery into a charger of the system in response to initiation of a state machine of the system powered by the rechargeable battery;
determine if a voltage of the rechargeable battery falls below a threshold level within a predetermined amount of time after initiation of the pull-down current; and
if so, provide a pre-charge current to the rechargeable battery from the charger, otherwise enable the system to power on using the rechargeable battery.

25. The article of claim 24, further comprising instructions to initiate drawing of the pull-down current upon a power-on event of the system.

26. The article of claim 25, further comprising instructions to prevent the drawing of the pull-down current for a predetermined time if the charger asserts a low battery signal upon the power-on event.

* * * * *

UNITED STATES PATENT AND TRADEMARK OFFICE
CERTIFICATE OF CORRECTION

PATENT NO. : 7,671,560 B2
APPLICATION NO. : 11/525383
DATED : March 2, 2010
INVENTOR(S) : Russell Croman, G. Diwakar Vishakhadatta and Lionel Cimaz

It is certified that error appears in the above-identified patent and that said Letters Patent is hereby corrected as shown below:

Column 11, line 59 "to determine" should be --determining--

Column 11, lines 63-65 delete "provides a pre-charge current to the rechargeable battery; and if so,"

Signed and Sealed this

Third Day of August, 2010

David J. Kappos
*Director of the United States Patent and Trademark Office*